(12) United States Patent
Krukar et al.

(10) Patent No.: US 9,508,387 B2
(45) Date of Patent: Nov. 29, 2016

(54) FLICK INTEL ANNOTATION METHODS AND SYSTEMS

(75) Inventors: Richard Krukar, Albuquerque, NM (US); Luis Ortiz, Albuquerque, NM (US); Kermit Lopez, Albuquerque, NM (US)

(73) Assignee: Flick Intelligence, LLC, Albuquerque, NM (US)

( * ) Notice: Subject to any disclaimer, the term of this patent is extended or adjusted under 35 U.S.C. 154(b) by 1129 days.

(21) Appl. No.: 12/976,148

(22) Filed: Dec. 22, 2010

(65) Prior Publication Data

US 2011/0158603 A1    Jun. 30, 2011

Related U.S. Application Data (60) Provisional application No. 61/291,837, filed on Dec. 31, 2009, provisional application No. 61/419,268, filed on Dec. 3, 2010.

(51) Int. Cl.
*G11B 27/11*      (2006.01)
*G11B 27/34*      (2006.01)
*H04N 9/82*       (2006.01)
*H04N 21/431*     (2011.01)
*H04N 21/4725*    (2011.01)
(Continued)

(52) U.S. Cl.
CPC .............. *G11B 27/11* (2013.01); *G11B 27/34* (2013.01); *H04N 21/431* (2013.01); *H04N 21/4316* (2013.01); *H04N 21/4725* (2013.01); *H04N 21/812* (2013.01); *H04N 21/8586* (2013.01); *H04N 9/8205* (2013.01)

(58) Field of Classification Search
CPC .......... G06Q 30/254; G06Q 30/0255; G08C 17/00; G11B 27/11; G11B 27/34; H04N 9/8205; H04N 21/4316; H04N 21/84
USPC ........................................ 386/278; 725/105
See application file for complete search history.

(56) References Cited

U.S. PATENT DOCUMENTS 5,796,396 A    8/1998  Rich
5,909,213 A    6/1999  Martin
(Continued)

FOREIGN PATENT DOCUMENTS

KR   10-2009-0107626 A   10/2009

OTHER PUBLICATIONS

U.S. Appl. No. 13/345,382, filed Jan. 6, 2012, Lopez et al.
(Continued)

*Primary Examiner* — Gelek W Topgyal
(74) *Attorney, Agent, or Firm* — Richard H. Krukar; Kermit D. Lopez; Luis M. Ortiz (57) ABSTRACT

Video content is a time varying presentation of scenes or video frames. Each frame can contain a number of scene elements such as actors, foreground items, background items, or other items. A person enjoying video content can select a scene element by specifying a screen coordinate while the video content plays. Frame specification data identifies the specific frame or scene being displayed when the coordinate is selected. The coordinate in combination with the frame specification data is sufficient to identify the scene element that the person has chosen, information about the scene element can then be presented to the person. An annotation database can relate the scene elements to the frame specification data and coordinates.

19 Claims, 4 Drawing Sheets

(51) Int. Cl.
*H04N 21/81* (2011.01)
*H04N 21/858* (2011.01)

(56) References Cited

U.S. PATENT DOCUMENTS

| | | |
|---|---|---|
| 6,727,887 B1 | 4/2004 | Levine et al. |
| 6,834,308 B1 | 12/2004 | Ikezoye et al. |
| 6,842,190 B1 | 1/2005 | Lord et al. |
| 6,968,337 B2 | 11/2005 | Wold |
| 7,197,234 B1 | 3/2007 | Chatterton |
| 7,242,389 B1 | 7/2007 | Stern |
| 7,363,278 B2 | 4/2008 | Schmelzer et al. |
| 7,500,007 B2 | 3/2009 | Ikezoye et al. |
| 7,529,659 B2 | 5/2009 | Wold |
| 7,562,012 B1 | 7/2009 | Wold et al. |
| 7,672,968 B2 | 3/2010 | Bradateanu et al. |
| 7,714,909 B2 | 5/2010 | Lord et al. |
| 7,864,159 B2 | 1/2011 | Sweetser et al. |
| 7,877,438 B2 | 1/2011 | Schrempp et al. |
| 7,917,645 B2 | 3/2011 | Ikezoye et al. |
| 7,945,927 B2 | 5/2011 | Jun et al. |
| 8,006,314 B2 | 8/2011 | Wold |
| 8,065,665 B1 | 11/2011 | Kosche et al. |
| 8,082,150 B2 | 12/2011 | Wold |
| 8,086,445 B2 | 12/2011 | Wold et al. |
| 8,086,575 B2 | 12/2011 | Putterman et al. |
| 8,089,455 B1 | 1/2012 | Wieder |
| 8,370,878 B2 | 2/2013 | Gharachorloo et al. |
| 8,751,942 B2 | 6/2014 | Lopez et al. |
| 2002/0002707 A1 | 1/2002 | Ekel et al. |
| 2002/0049975 A1 | 4/2002 | Thomas et al. |
| 2002/0056136 A1 | 5/2002 | Wistendahl et al. |
| 2002/0083469 A1 | 6/2002 | Jeannin et al. |
| 2002/0167484 A1* | 11/2002 | Hatanaka ........... H04N 7/17318 345/156 |
| 2004/0088739 A1* | 5/2004 | Shimoji et al. ............... 725/135 |
| 2004/0153456 A1 | 8/2004 | Charnock et al. |
| 2004/0205482 A1 | 10/2004 | Basu et al. |
| 2005/0010553 A1 | 1/2005 | Liu |
| 2005/0114325 A1 | 5/2005 | Liu et al. |
| 2005/0216866 A1 | 9/2005 | Rosen et al. |
| 2005/0223034 A1 | 10/2005 | Kaneko et al. |
| 2006/0080130 A1* | 4/2006 | Choksi .............................. 705/1 |
| 2006/0264209 A1 | 11/2006 | Atkinson et al. |
| 2006/0282776 A1 | 12/2006 | Farmer et al. |
| 2007/0186269 A1 | 8/2007 | Malik |
| 2007/0288640 A1 | 12/2007 | Schmeider |
| 2008/0066129 A1* | 3/2008 | Katcher et al. ............... 725/109 |
| 2008/0208589 A1 | 8/2008 | Cross et al. |
| 2009/0007023 A1 | 1/2009 | Sundstrom |
| 2009/0092374 A1 | 4/2009 | Kulas |
| 2009/0103887 A1 | 4/2009 | Choi et al. |
| 2009/0147990 A1 | 6/2009 | Lev |
| 2009/0228492 A1 | 9/2009 | Valdez et al. |
| 2009/0319884 A1 | 12/2009 | Amento et al. |
| 2009/0319885 A1 | 12/2009 | Amento et al. |
| 2009/0327894 A1 | 12/2009 | Rakib et al. |
| 2010/0050082 A1 | 2/2010 | Katz et al. |
| 2010/0138517 A1 | 6/2010 | De Los Reyes et al. |
| 2010/0154007 A1 | 6/2010 | Touboul et al. |
| 2010/0226626 A1 | 9/2010 | Lord et al. |
| 2010/0235379 A1 | 9/2010 | Reichbach |
| 2010/0235865 A1 | 9/2010 | Jordan et al. |
| 2010/0293190 A1* | 11/2010 | Kaiser et al. ................. 707/769 |
| 2011/0137753 A1 | 6/2011 | Moehrle |
| 2011/0138317 A1 | 6/2011 | Kang et al. |
| 2011/0167447 A1 | 7/2011 | Wong |
| 2011/0173141 A1 | 7/2011 | Campbell et al. |
| 2012/0062468 A1 | 3/2012 | Chen et al. |
| 2012/0069131 A1 | 3/2012 | Abelow |
| 2012/0139839 A1 | 6/2012 | Krukar et al. |
| 2014/0344719 A1 | 11/2014 | Lopez et al. |
| 2016/0182971 A1 | 6/2016 | Ortiz et al. |

OTHER PUBLICATIONS

U.S. Appl. No. 13/345,404, filed Jan. 6, 2012, Krukar et al.
U.S. Appl. No. 13/413,859, filed Mar. 7, 2012, Ortiz et al.
U.S. Appl. No. 14/253,223, filed Apr. 15, 2014, Lopez et al.
U.S. Appl. No. 13/371,602, filed Feb. 13, 2012, Krukar et al.
U.S. Appl. No. 14/976,493, filed Dec. 21, 2015, Ortiz et al.
Oct. 16, 2012, Pre-interview First Action, U.S. Appl. No. 13/345,382.
Nov. 16, 2012, Amendment/Reply, U.S. Appl. No. 13/345,382.
Dec. 7, 2012, First Action Interview—Office Action, U.S. Appl. No. 13/345,382.
Jan. 7, 2013, Amendment/Reply, U.S. Appl. No. 13/345,382.
Mar. 25, 2013, Final Rejection, U.S Patent Application U.S. Appl. No. 13/345,382.
May 28, 2013, Amendment/Reply, U.S. Appl. No. 13/345,382.
Dec. 24, 2013, Appeal Brief Filed, U.S. Appl. No. 13/345,382.
Mar. 13, 2014, Notice of Allowance, U.S. Appl. No. 13/345,382.
Apr. 15, 2014, Amendment/Reply, U.S. Appl. No. 13/345,382.
May 8, 2014, Amendment/Reply, U.S. Appl. No. 13/345,382.
Feb. 18, 2016, Non-Final Rejection, U.S. Appl. No. 14/253,223.
Apr. 27, 2016, Amendment/Response, U.S. Appl. No. 14/253,223.
May 13, 2016, Notice of Allowance, U.S. Appl. No. 14/253,221.
May 26, 2016, Miscellaneous Communication to Applicant, U.S. Appl. No. 14/253,223.
Sep. 27, 2013, Pre-Interview First Action, U.S. Appl. No. 13/345,404.
Nov. 27, 2013, Amendment/Remarks, U.S. Appl. No. 13/345,404.
Mar. 10, 2014, First Action Interview Office Action, U.S. Appl. No. 13/345,404.
Jun. 10, 2014, Reply, U.S. Appl. No. 13/345,404.
Oct. 9, 2014, Final Rejection, U.S. Appl. No. 13/345,404.
Dec. 5, 2012, Non-Final Rejection, U.S. Appl. No. 13/371,602.
Apr. 4, 2013, Amendment/Response, U.S. Appl. No. 13/371,602.
Aug. 13, 2013, Final Rejection, U.S. Appl. No. 13/371,602.
Dec. 13, 2013, Amendment/Response, U.S. Appl. No. 13/371,602.
Mar. 12, 2014, Supplemental Amendment/Response, U.S. Appl. No. 13/371,602.
Mar. 14, 2014, Non-Final Rejection, U.S. Appl. No. 13/371,602.
Aug. 14, 2014, Amendment/Response, U.S. Appl. No. 13/371,602.
Dec. 3, 2014, Final Rejection, U.S. Appl. No. 13/371,602.
Apr. 3, 2015, Notice of Appeal & Pre-Brief Conference Request, U.S. Appl. No. 13/371,602.
Jun. 2, 2015, Pre-Brief Appeal Conference Decision, U.S. Appl. No. 13/371,602.
Jul. 2, 2015, Appeal Brief Filed, U.S. Appl. No. 13/371,602.
Sep. 25, 2015, Appeal Brief Filed, U.S. Appl. No. 13/371,602.
Mar. 9, 2016, Examiner's Answer to Appeal Brief, U.S. Appl. No. 13/371,602.
May 9, 2016, Reply Brief Filed, U.S. Appl. No. 13/371,602.
Aug. 14, 2013, Pre-interview first office action, U.S. Appl. No. 13/413,859.
Dec. 3, 2013, Amendment/Response, U.S. Appl. No. 13/413,859.
Mar. 11, 2014, First Action Interview—Office Action, U.S. Appl. No. 13/413,859.
Jun. 11, 2014, Amendment/Response, U.S. Appl. No. 13/413,859.
Nov. 5, 2014, Final Rejection, U.S. Appl. No. 13/413,859.
Mar. 5, 2015, Amendment/Response, U.S. Appl. No. 13/413,859.
Aug. 17, 2015, Non-Final Rejection, U.S. Appl. No. 13/413,859.
Dec. 17, 2015, Amendment/Response, U.S. Appl. No. 13/413,859.
Apr. 20, 2016, Final Rejection, U.S. Appl. No. 13/413,859.
Jun. 17, 2016, Response after Final Action, U.S. Appl. No. 13/413,859.

* cited by examiner

FLICK INTEL ANNOTATION METHODS AND SYSTEMS

CROSS REFERENCE TO RELATED APPLICATIONS

This patent application claims the priority and benefit of U.S. provisional patent application 61/291,837, entitled "Systems and Methods for obtaining background data associated with a movie, show, or live sporting event", filed on Dec. 31, 2009 and of U.S. Provisional Patent Application No. 61/419,268, filed Dec. 3, 2010, entitled "FlickIntel Annotation Systems and Webcast Infrastructure". Provisional Patent Applications 61/291,837 and 61/419,268 are herein incorporated by reference.

TECHNICAL FIELD

Embodiments relate to video content, video displays, and video compositing. Embodiments also relate to computer systems, user input devices, databases, and computer networks.

BACKGROUND OF THE INVENTION

People have watched video content on televisions and other audio-visual devices for decades. They have also used gaming systems, personal computers, handheld devices, and other devices to enjoy interactive content. They often have questions about places, people and things' appearing as the video content is displayed, and about the music they hear. Databases containing information about the content such as the actors in a scene or the music being played already exist and provide users with the ability to learn more.

The existing database solutions provide information about elements appearing in a movie or scene, but only in a very general way. A person curious about a scene element can obtain information about the scene and hope that the information mentions the scene element in which the person is interested. Systems and methods that provide people with the ability to select a specific scene element and to obtain information about only that element are needed.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of the embodiments that a media device can provide video content to a display device and that a person can view the video content as it is presented on the display device. A series of scenes or a time varying series of frames along with any audio dialog, music, or sound effects are examples of video content.

It is another aspect of the embodiments that the person can choose a coordinate on the display device. A coordinate can be chosen with a pointing device or any other form of user input by which the person can indicate a spot on the display device and select that spot. Frame specification data can be generated when the person chooses the coordinate. The frame specification data can identify a specific scene or frame within the video content.

It is yet another aspect of the embodiments to provide an element identifier based on the coordinate and the frame specification data. Element identifiers are uniquely associated with scene elements. The element identifier can be obtained by querying an annotation database that relates element identifiers to coordinates and frame specification data. The element identifier can also be provided by a human worker who views the scene or frame, looks to the coordinate, and reports what appears at that location.

BRIEF DESCRIPTION OF THE DRAWINGS

The accompanying figures, in which like reference numerals refer to identical or functionally similar elements throughout the separate views and which are incorporated in and form a part of the specification, further illustrate aspects of the embodiments and, together with the background, brief summary, and detailed description serve to explain the principles of the embodiments.

DETAILED DESCRIPTION

The particular values and configurations discussed in these non-limiting examples can be varied and are cited merely to illustrate at least one embodiment and are not intended to limit the scope thereof. In general, the figures are not to scale.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

Video content is a time varying presentation of scenes or video frames. Each frame can contain a number of scene elements such as actors, foreground items, background items, or other items. A person enjoying video content can select a scene element by specifying a screen coordinate while the video content plays. Prerecorded content can be enhanced with media tags. Each movie, television show, or other broadcast can have a unique identifier. The time at which an activator is triggered supplies a time stamp that can be used to identify a specific frame in the content. Frame specification data identifies the specific frame or scene being displayed when the screen coordinate is selected. The pointer and the media device sending the displayed content to the display being pointed at must cooperate because the pointer (or pointing subsystem) provides the aim point while the media device provides the time stamp and media tag. The screen coordinate in combination with the frame specification data is sufficient to identify the scene element that the person has chosen. Information about the scene element can then be presented to the person. An annotation database can associate scene elements with frame specification data and coordinates.

Figure 1:
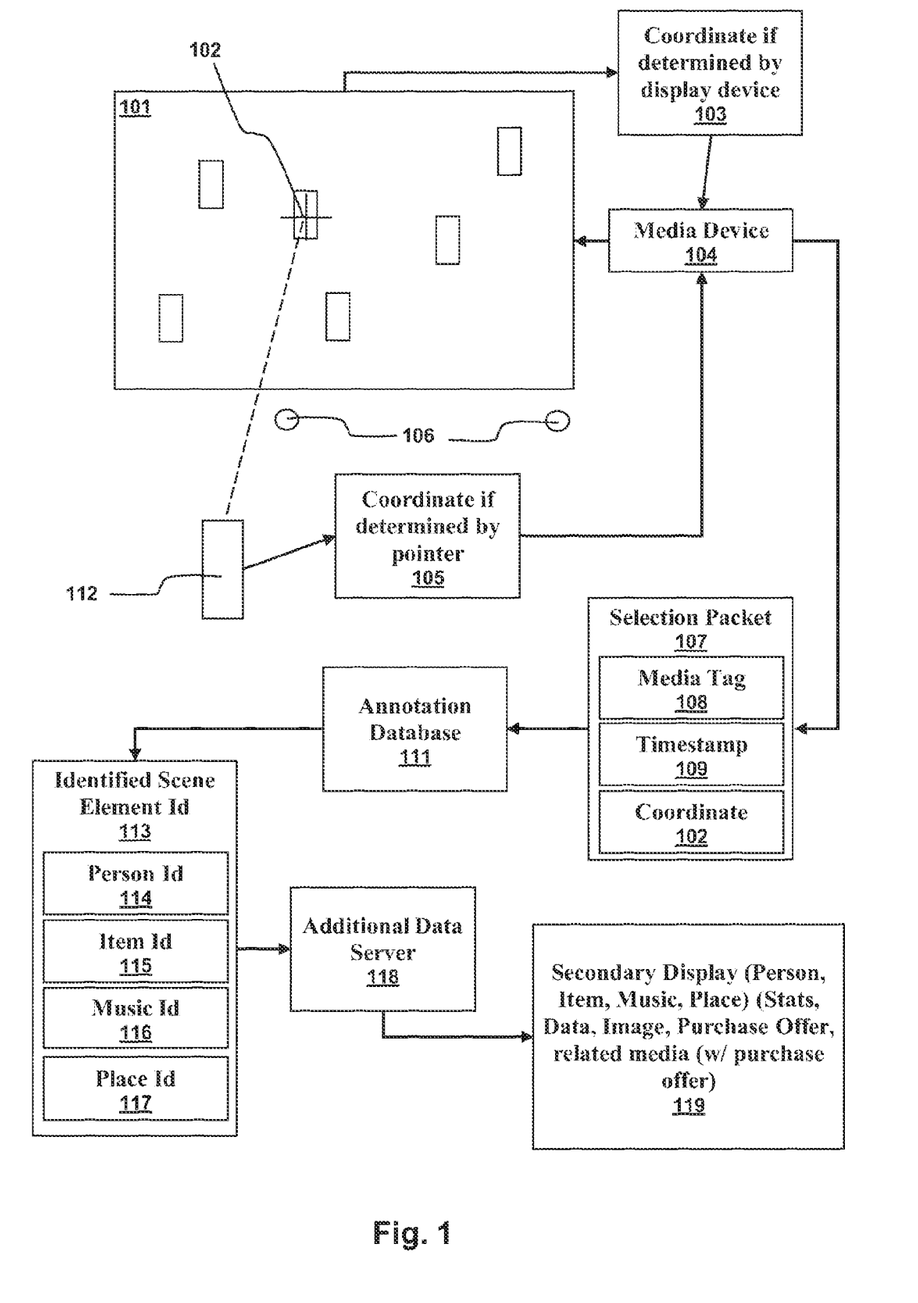
FIG. 1 illustrates element data being presented on a second display in response to the selection of a scene element on a first display in accordance with aspects of certain embodiments.

FIG. 1 illustrates element data being presented on a second display 119 in response to the selection of a scene element on a display 101 in accordance with aspects of certain embodiments. A media device 104 passes video content to the display 101 to be viewed by a person. The person can manipulate a selection device 112 to choose a coordinate 102 on a display device 101. The coordinate can then be passed to a media device 104. In some embodiments the selection device can detect the coordinate 105. For example, the selection device 112 can detect the locations of emitters 106 and infer the screen position being pointed at from those emitter locations. In other embodiments the display 101 can detect the coordinate 103. For example, the selection device can emit a light beam that the display device detects. Other common coordinate selection means include mice, trackballs, and touch sensors. More advanced pointing means can observe the person's body or eyeballs to thereby determine a coordinate. Clicking a button or some other action can generate an event indicting that a scene element is chosen.

The media device 104 can generate a selection packet 107 that includes frame selection data and the coordinate 102. The frame selection data is data that is sufficient to identify a specific frame or scene. For example, the frame selection data can be a media tag 108 and a timestamp 109. The media tag 108 can identify a particular movie, show, sporting event, advertisement, video clip, scene or other unit of video content. A timestamp 109 specifies a time within the video content. In combination, a media tag and timestamp can specify a particular frame from amongst all the frames of video content that have ever been produced.

The frame selection packet 107 can be formed into a query for an annotation database 111. The annotation database 111 can contain associations of element identifiers associated with frame selection data and coordinates. As such, the annotation database 111 can produce an element identifier 113 in response to the query. The element identifier 113 can identify a person 114, an item 115, music 116, a place 117, or something else.

The element identifier 113 can then be passed to another server 118 that responds by producing element data for presentation to the person. Examples of element data include, but are not limited to: statistics on a person such as an athlete; a picture of a person, object or place; an offer for purchase of an item, service, or song; and links to other media in which a person, item, or place appears.

Figure 2:
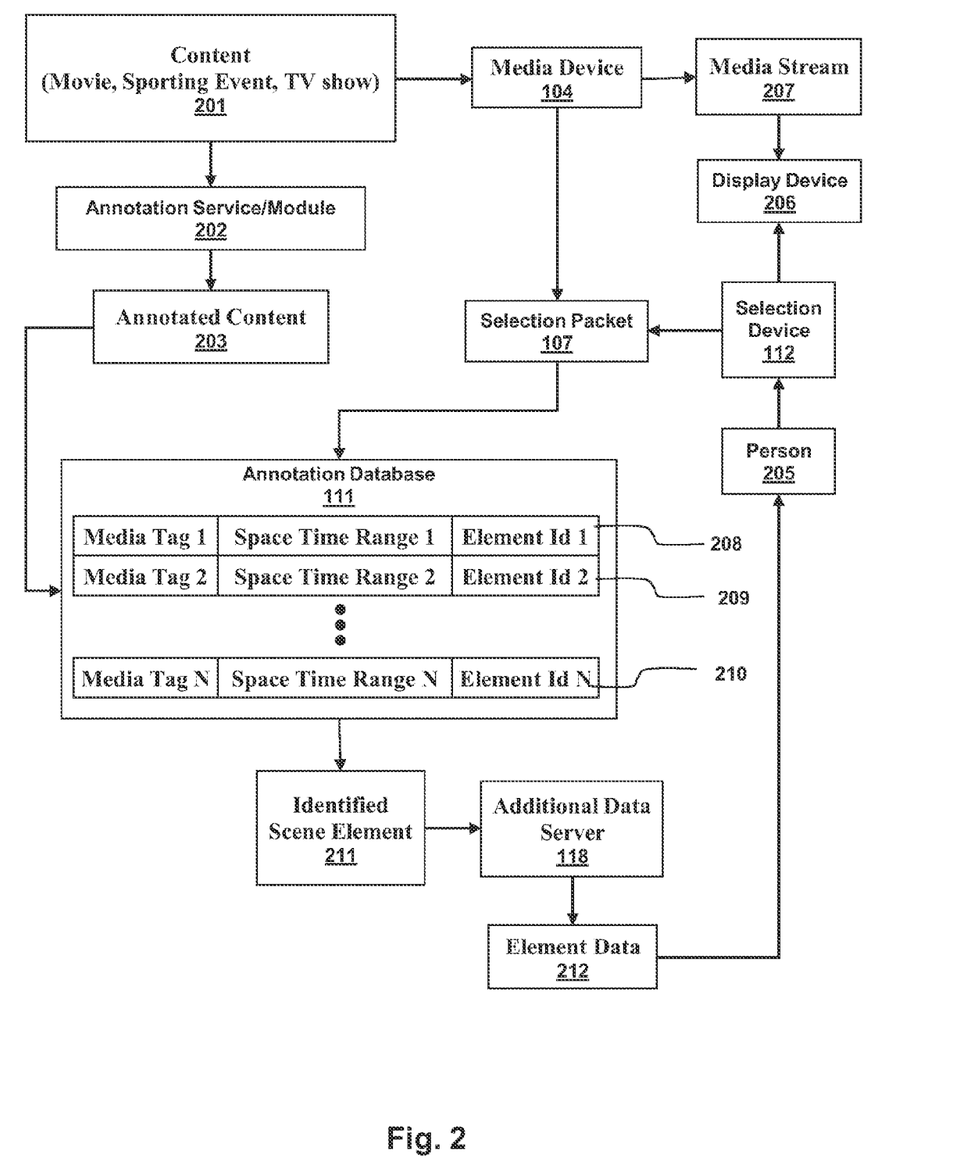
FIG. 2 illustrates an annotation database providing element identifiers in response to a person selecting scene elements in accordance with aspects of the embodiments.

FIG. 2 illustrates an annotation database 111 providing element identifiers 211 in response to a person selecting scene elements in accordance with aspects of the embodiments. An annotation service/module 202 can produce annotated content 203 by annotating content 201. An annotation module is a device, algorithm, program, or other means that automatically annotates content. Image recognition algorithms can locate items within scenes and frames and thereby automatically provide annotation data. An annotation service is a service provider that annotates content. An annotation service provider can employ both human workers and annotation modules.

Annotation is a process wherein scene elements, each having an element identifier, are associated with media tags and space time ranges. A space time range identifies a range of times and positions at which a scene element appears. For example, a car can sit unmoving during an entire scene. The element identifier can specify the make, model, color, and trim level of the car, the media tag can identify a movie containing the scene, and the space time range can specify the time range of the movie scene and the location of the car within the scene.

The content 201 can be passed to a media device 104 that produces a media stream 207 for presentation on a display device 206. A person 205 watching the display device 206 can use a selection device 112 to choose a coordinate on the display device 206. A selection packet 107 containing the coordinate and some frame specification data can then be passed to the annotation database 111 which responds by identifying the scene element 211. An additional data server 118 can produce element data 212 for that identified scene element 211. The element data 212 can then be presented to the person.

Figure 3:
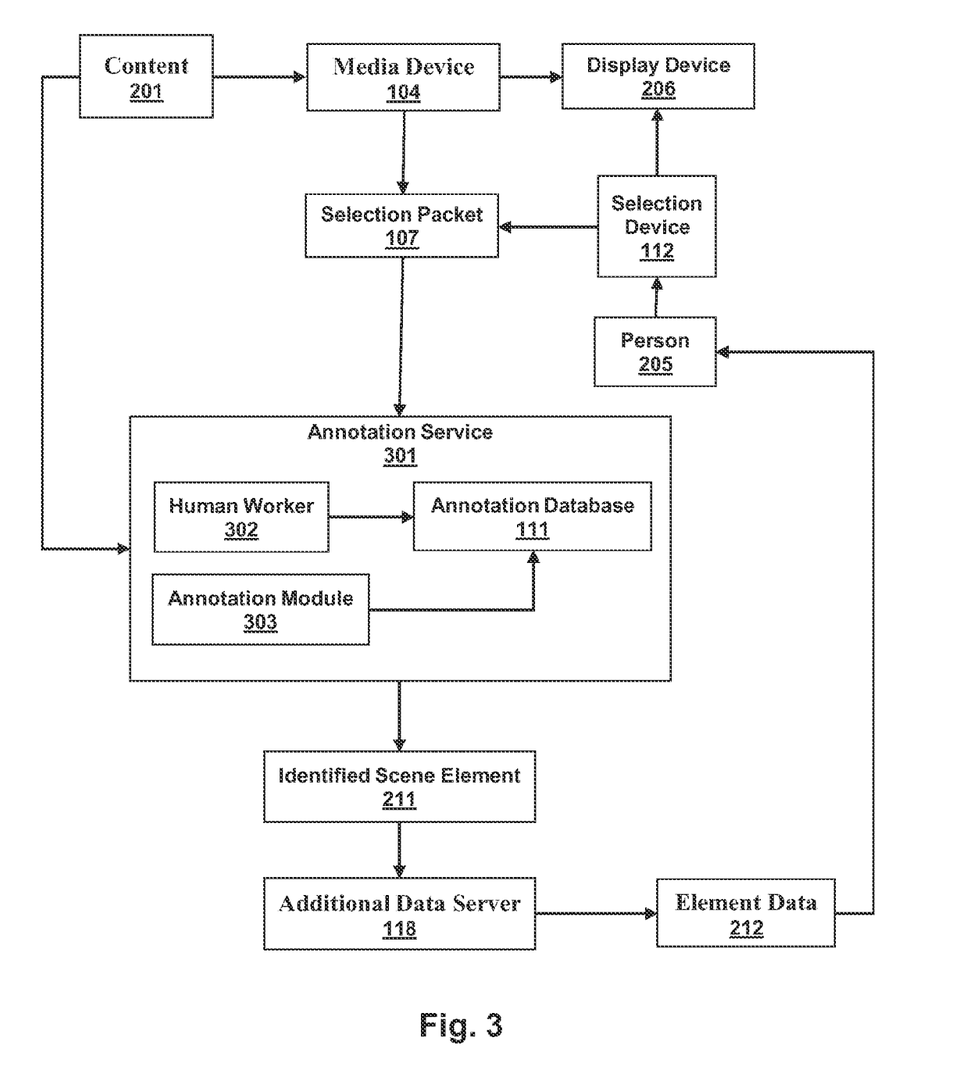
FIG. 3 illustrates an annotation service providing element identifiers in response to a person selecting scene elements in accordance with aspects of the embodiments.

FIG. 3 illustrates an annotation service providing element identifiers in response to a person selecting scene elements in accordance with aspects of the embodiments. The embodiment of FIG. 3 differs from that of FIG. 2 in that the content 201 is not necessarily annotated before being viewed by the person 205. The selection packet 107 is passed to the annotation service 301 where a human worker 302 or annotation module 303 determines what scene element the person 205 selected and creates a new annotation entry for incorporation into the annotation database 111.

Figure 4:
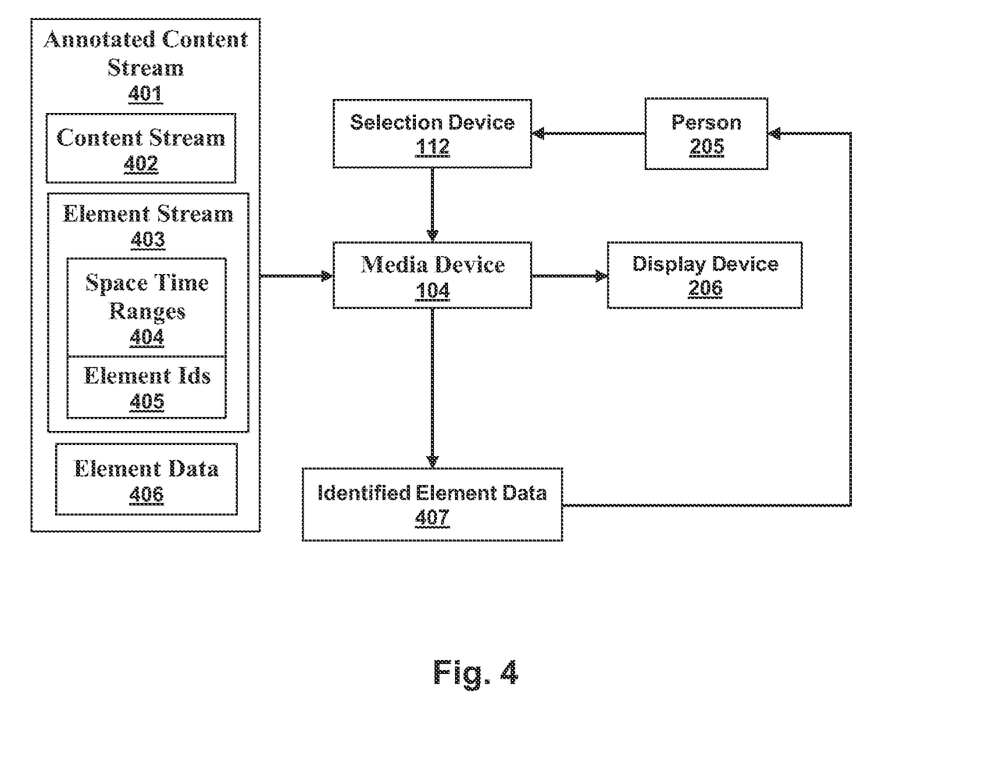
FIG. 4 illustrates an annotated content stream passing to a media device such that the media device produces element data in accordance with aspects of certain embodiments.

FIG. 4 illustrates an annotated content stream 401 passing to a media device 104 such that the media device 104 produces element data 407 in accordance with aspects of certain embodiments. Annotated content, such as annotated content 203 of FIG. 2, can be passed as an annotated content stream 401 to the media device 104. The annotated content stream 401 can include a content stream 402, element stream 403, and element data 406. The media device 104 can then pass the content for presentation on the display 206 and store the element data 406 and the data in the element stream 403. The data in the element stream 403 can be formed into an annotation database with the possible exception that no media tag is needed. No media tag is needed because all the annotations refer only to the content stream 402. As such, the element stream 403 is illustrated as containing only space time ranges 404 and element identifiers 405.

The media device 104, having assembled an annotation database and having stored element data 406, can produce element data 407 for a scene element selected by a person 205 without querying remote databases or accessing remote resources.

Note that in practice, the content stream 402, element stream 403, and element data 406 can be transferred separately or in combination as streaming data. Means for transferring content, annotations, and element data include TV signals and storage devices such as DVD disks or data disks. Furthermore, the element data 406 can be passed to the media device 104 or can be stored and accessed on a remote server.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language, in a visually oriented programming environment such as, for example, VisualBasic, or in functional programming languages such as LISP or Erlang.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The invention is described in part below with reference to flowchart illustrations and/or block diagrams of methods, systems, computer program products, and data structures according to embodiments of the invention. It will be understood that each block of the illustrations, and combinations of blocks, can be implemented by computer program Instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The invention claimed is:

1. A system comprising:
    a display device that displays video content to a person wherein the video content comprises a plurality of frames;
    a media device that provides the video content to the display device;
    a pointing device that the person uses to choose a screen coordinate on the display device;
    frame specification data that identifies the video content and which of the frames was displayed on the display device when the person chose the screen coordinate;
    a query comprising the screen coordinate and the frame specification data; and
    an element identifier provided by an annotation database in response to receiving the query wherein the annotation service comprises a human worker who determines the element identifier based upon the query.

2. The system of claim 1 wherein the video content is a movie, show, advertisement, or sporting event.

3. The system of claim 2 wherein the frame specification data comprises a timestamp and a media tag wherein the media tag uniquely identifies the video content to distinguish the video content from other prerecorded content, wherein the timestamp identifies a frame of the video content and wherein the frame was displayed to the user when the user chose the screen coordinate.

4. The system of claim 3 further comprising:
    an additional data server that produces element data based on the element identifier; and
    a data presentation that displays the element data to the person.

5. The system of claim 4 wherein the element identifier corresponds to an item for sale and the data presentation comprises an offer for the user to purchase the item.

6. The system of claim 4 wherein the element identifier corresponds to a person and the data presentation provides information about that person.

7. The system of claim 4 wherein the element identifier corresponds to a song and the data presentation comprises an offer for the user to purchase a copy of the song.

8. The system of claim 4 wherein the element identifier corresponds to a location and the data presentation comprises travel information for reaching the location.

9. The system of claim 1 further comprising:
an additional data server that produces element data based on the element identifier;
and a data presentation that displays the element data to the person.

10. A system comprising:
a display device that displays video content to a person wherein the video content comprises a plurality of frames;
a media device that provides the video content to the display device;
a pointing device that the person uses to choose a screen coordinate on the display device;
frame specification data that identifies the video content and which of the frames was displayed on the display device when the person chose the screen coordinate;
a query comprising the screen coordinate and the frame specification data; and
an element identifier provided by an annotation service in response to receiving the query wherein the annotation service is provided by a service provider wherein the annotation service comprises a human worker who determines the element identifier based upon the query.

11. The system of claim 10 wherein the annotation service comprises an annotation database running on a remote server and wherein the annotation database receives the query and provides the element identifier.

12. The system of claim 10 further comprising an annotation database wherein the human worker causes the frame specification data, the screen coordinate, and the element identifier to be entered into the annotation database.

13. The system of claim 10 further comprising an additional data server that produces element data based on the element identifier and wherein the human worker causes the element data to be provided to the person.

14. A method comprising:
receiving, by an annotation service, a query specifying a screen coordinate, video content and a frame of the video content, wherein the screen coordinate specifies a location within the frame, and wherein a person selected the screen coordinate within the frame; and
producing, by the annotation service, an element identifier corresponding to a scene element visible in the frame and located at the screen coordinate to thereby identify an on-screen item to the person wherein a human worker determines the element identifier based upon the query.

15. The method of claim 14 further comprising querying an annotation database to thereby obtain the element identifier.

16. The method of claim 15 wherein the element identifier specifies a purchasable item and wherein the element data comprises an offer for the user to buy the purchasable item.

17. The method of claim 15 wherein the scene element is a person.

18. The method of claim 14 further comprising:
locating element data relating to the element identifier; and
presenting the element data to the person.

19. The method of claim 18 wherein the element identifier specifies a purchasable item and wherein the element data comprises an offer for the user to buy the purchasable item.

* * * * *

UNITED STATES PATENT AND TRADEMARK OFFICE
CERTIFICATE OF CORRECTION

| | | |
|---|---|---|
| PATENT NO. | : 9,508,387 B2 | Page 1 of 1 |
| APPLICATION NO. | : 12/976148 | |
| DATED | : November 29, 2016 | |
| INVENTOR(S) | : Richard Krukar et al. | |

It is certified that error appears in the above-identified patent and that said Letters Patent is hereby corrected as shown below:

On the Title Page

[54] Title and in the Specification, Column 1:
Please delete "FLICK INTEL ANNOTATION METHODS AND SYSTEMS" and insert therefore
--VIDEO ANNOTATION METHODS AND SYSTEMS FOR MOVIES, SHOWS, ADVERTISEMENTS AND SPORTING EVENTS--.

Signed and Sealed this
Twenty-fourth Day of January, 2017

Michelle K. Lee
*Director of the United States Patent and Trademark Office*